United States Patent [19]
Godines

[11] 3,779,521
[45] Dec. 18, 1973

[54] EXTRUSION ASSEMBLY

[75] Inventor: Henri Godines, Aubervilliers, France

[73] Assignee: Creusot-Loire, Paris, France

[22] Filed: Apr. 27, 1972

[21] Appl. No.: 248,243

[52] U.S. Cl. .................................. 259/191, 259/5
[51] Int. Cl. .................................. B01f 7/08
[58] Field of Search .............. 259/6, 9, 10, 97, 259/191, 192, 193, 5, 21, 40; 425/205, 207, 208, 209

[56] References Cited
UNITED STATES PATENTS
2,957,427 10/1960 O'Connor ..................... 259/6 X
3,006,615 10/1961 Mason ......................... 259/9 X

FOREIGN PATENTS OR APPLICATIONS
20,979 10/1963 Japan ........................ 425/205
4,574 10/1965 Japan ........................ 425/205

Primary Examiner—Harvey C. Hornsby
Assistant Examiner—Philip R. Coe
Attorney—William B. Kerkam, Jr.

[57] ABSTRACT

An extruder for feeding a die which extruder includes a mixer unit and a pump unit each of which comprise a screw rotatable in a sleeve, the mixer unit screw having a succession of threads of different pitch while the pump unit sleeve is internally threaded with N threads of pitch P and the pump unit screw has a mating profile, has $(N-1)P/N$ threads and is movable in orbital rotation about the pump unit sleeve axis in contact with the sleeve.

1 Claim, 2 Drawing Figures

FIG:1

EXTRUSION ASSEMBLY

The present invention refers to an extrusion unit intended to equip an extruder for shaping plastic materials and, e.g., manufacture of sections or tubes.

Every extruder has a screw device rotating in a sleeve the end of which carries the die characteristic of the finished product. This unit, generally heated, acts both as a mixer to mix the various thermoplastic products which go to compose the final material and the additives such as colourants, and as a pump to force the plasticized product through the die which gives it its permanent profile. For good quality of finished product and extruder must therefore ensure perfect homogeneity of the plasticized product and on the other hand its extrusion at a pressure independent of the output.

Homogenisation must be obtained by continuous kneading of the polymer, an action effected by exerting upon the molecules shear forces perpendicular to the direction of displacement. This function of homogenisation will be effected with least risk of deterioration of the product if the elemental volume of plastic material being worked at any instant in the spaces bounded by the screw and the stator remains below a certain limit which is a function of the type of material being worked and is practically independent of the size of the extruder. So the output cannot be increased by simply increasing the volume of the free spaces between the screw and the stator, but only by increasing the length of the extruder if the limits of the speeds of rotation and of external application of calories have already been reached.

The output pressure must be adjustable and independent of the output. This characteristic can only be obtained with a strictly volumetric final stage, assuming that all degasifying operations have already been performed in the stages upstream.

The achievement of these two functions under the best conditions has up to now only been obtained by extrusion devices with a number of screws rotating in the same sense and generally devices with two or four screws. These multi-screw devices enable a practically volumetric output stage to be obtained, which enables a constant output independent of the pressure. But that is a matter of complex machines of high cost price because of the great technical difficulties of production. So it is that even in a device with two parallel screws it is necessary to ensure perfect angular synchronism between the two screws rotating in the same sense. Furthermore the production of two intersecting parallel bores of great length and high precision, intended to receive the two extrusion screws, presents extremely difficult problems of machining. Finally it has already been emphasized that in order that the material should be divided into sufficiently small elemental volumes to enable sufficient homogenisation, it is necessary to keep to a relatively small diameter of extrusion screw. In the case of a system with two parallel screws and taking into account the magnitude of the forces coming into play during extrusion, the problem of accomplishing the mating of the screws limits very considerably the power of the apparatus which can utilize this technique.

The present invention enables the combination in a single extrusion unit of the greater sturdiness and simplification of machining offered by the solution with a single extrusion screw on the one hand, and of a strictly volumetric final stage which up to the present has only been obtainable by solutions with a number of screws on the other.

The invention is applied to an extrusion unit with a screw rotating in a sleeve ending in a die, comprising a so-called mixing zone in which a screw having a succession of threads of different pitches rotates in a circular bore coaxial with the sleeve, and a so-called pumping zone intended to force the product through the die.

In accordance with the invention the sleeve is machined internally in the pumping zone with a helicoidal profile with N threads of pitch P, an off-centred screw of mating profile with $(N-1)$ threads of pitch $(N-1)P/N$ being connected to a mechanism for setting it in orbital rotation about the axis of the sleeve by bearing against the internal surface of the sleeve.

The invention will now be described in greater detail with reference to a particular embodiment given by way of example and shown in the drawings.

Figure 1:
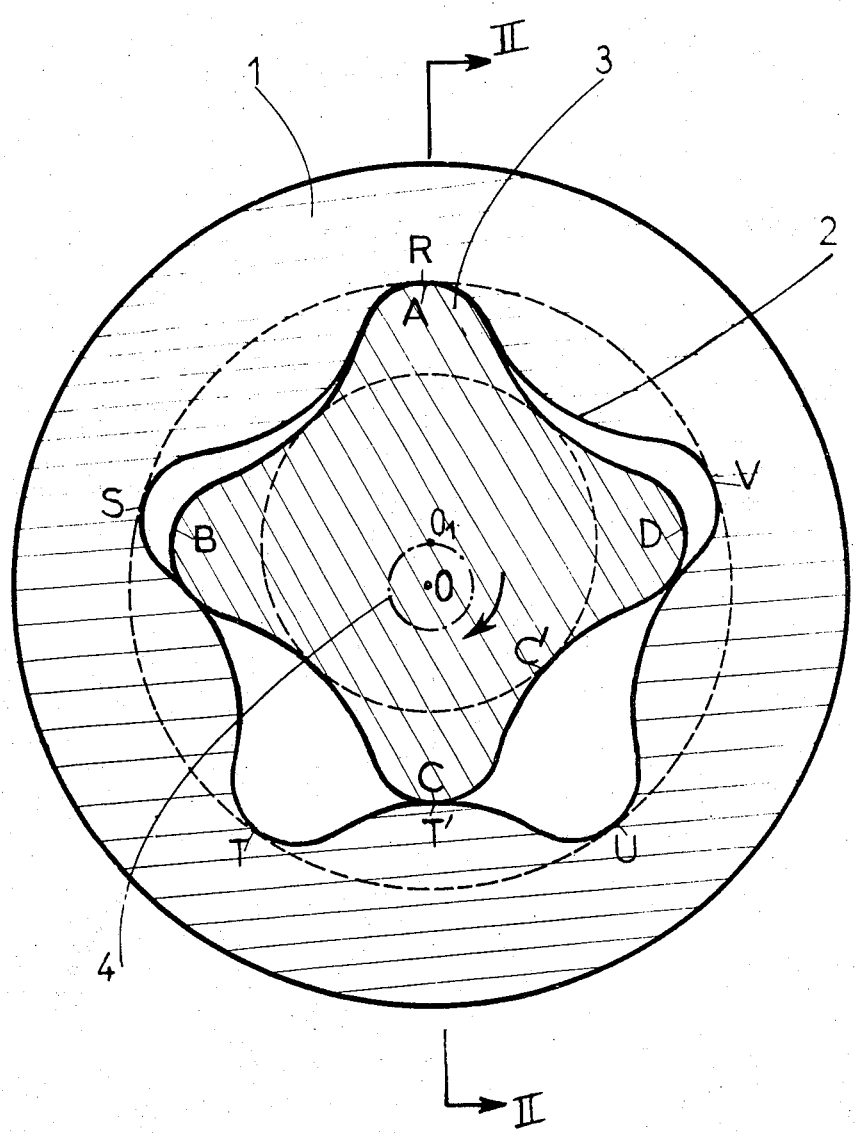
FIG. 1 is a cross-section of the pumping zone of an embodiment of an extrusion unit in accordance with the invention.

When referring to FIG. 1 which shows a section of the extrusion unit in its said second pumping portion, it must be understood that the first portion of this extrusion unit is produced in a manner entirely conventional to a single-screw extruder. In this first mixer zone, not shown on the drawings, the extrusion unit therefor has a sleeve provided with a cylindrical bore of circular section in which rotates a screw having a succession of threads of different pitches. In a known and conventional manner the materials entering this mixer zone progress towards the pumping zone undergoing a series of compressions, expansions and transverse shearings which produces homogenisation of the mixture and elimination of the gases in the mixture. It must likewise be understood that both in the conventional mixer zone and in the pumping zone, the sleeve has heating devices of an entirely conventional type which have on that account not been shown on the attached drawings.

The sleeve 1, externally cylindrical, is machined internally along a helicoidal profile 2 with five threads of centre O and pitch P. This profile is machined as a threading with five threads obtained with a tool of suitable shape. The screw 3 which rotates inside the sleeve 1 displays a mating threading with four threads of pitch four-fifths of P. The axis $O_1$ of the screw is off-centered with respect to the axis O of the internal threading of the sleeve. The screw 3 is driven in rotation about the axis O, bearing continuously during its rotation against the internal profile 2 of the sleeve. The axis $O_1$ of the screw 3 therefore moves in circular cylinder 4 coaxial with the axis 0. The screw 3 and the internal surface 2 of the sleeve form the boundaries of a series of closed helicoidal chambers. During the orbital type of rotation of the screw 3 about the axis O the closed helicoidal chambers progressively deform at constant volume. Thus any plastic material introduced into these chambers when they open out at the end of the mixer zone gets propelled towards the end with the die after the fashion of a paste squeezed from a tube by deformation perpendicular to the sense of extrusion. In the present case this deformable tube is helicoidal. Because of the shape of the threads, the movement of the screw is strictly rolling without sliding on the profile 2, which guarantees good mechanical behaviour. Furthermore, because the screw in rotation bears against the sleeve there is no synchronisation to be provided between the movement of the screw about the axis O and the rotation of the screw itself about its own axis $O_1$.

The volume of the helicoidal chambers defined by the two mated threads of the screw and sleeve has been calculated not to exceed the limiting elemental volume. The number of pitches, that is, of successive helicoidal chambers, has been chosen to guarantee practically absolute sealing.

Figure 2:
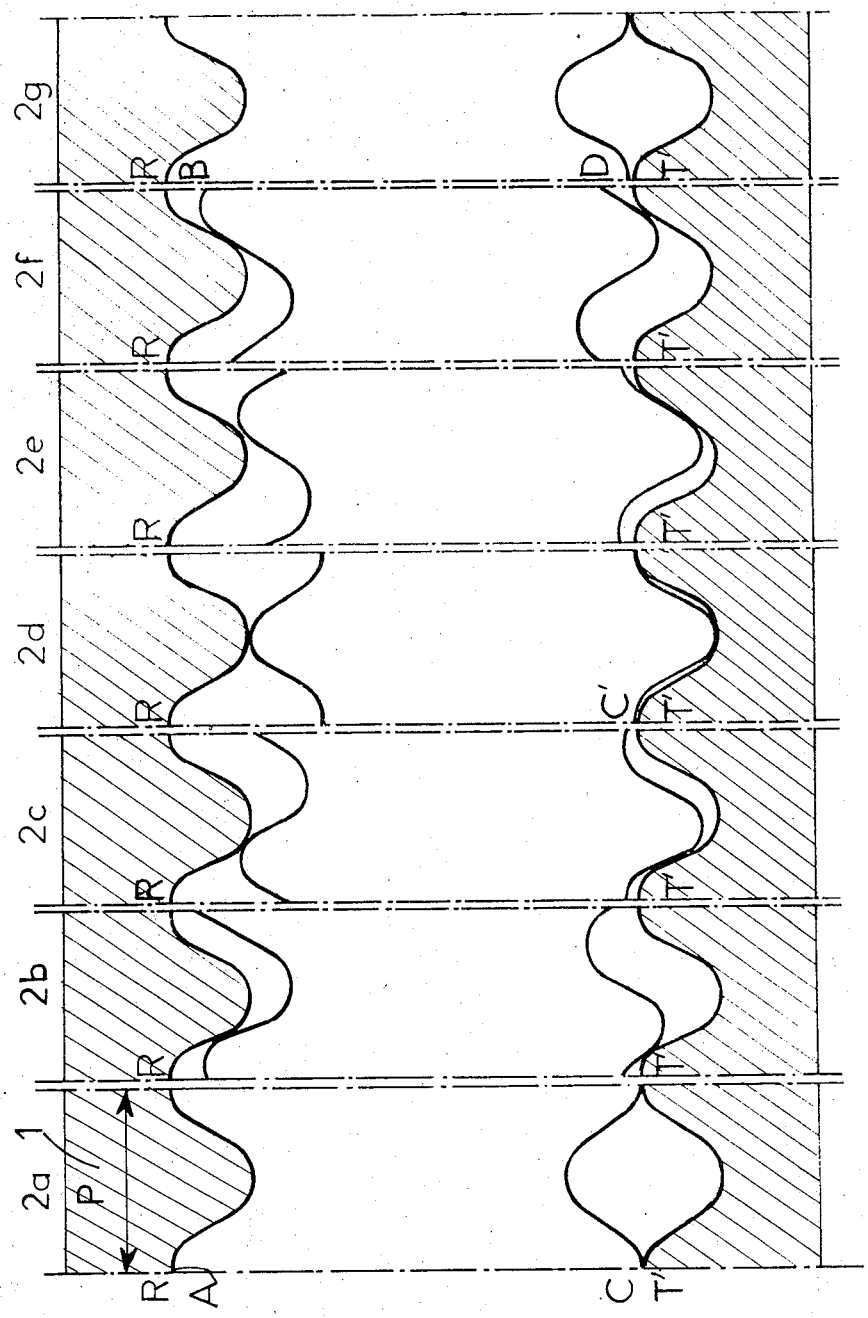
FIG. 2 is the juxtaposition of successive views of a portion of axial section in the pumping zone during one complete rotation of the screw in the sleeve.

The development of the section of a helicoidal chamber will be seen better from reference to FIG. 2 showing the same cross-section during one complete rotation of the screw 3 about the axis O.

The part figures 2a, 2b . . . 2g are all successive views of the same portion of an axial cross section along II—II of FIG. 1; thus in the upper half they show the section of the chamber in the vicinity of the root R of the thread in the sleeve and in the lower half in the vicinity of the apex $T^1$ respectively.

The part-figure 2a corresponds with the relative position of screw and sleeve as shown in FIG. 1. In this case the point A which is the apex of a thread of the screw is in contact with the point R at the root of a thread in the sleeve. The subsequent part-figures correspond with single points during the one complete rotation of the screw about the axis O and in the sense of the arrow shown in FIG. 1.

The part-figure 2b corresponds with the instant when the apex B of the screw is coming into contact with the root S of the sleeve. It can be seen that in the corresponding cross-section of the chamber which was zero in the vicinity of the point R in FIG. 2a has slightly enlarged, just as the volume of the chamber in the vicinity of the point $T^1$ opposite.

The part-figure 2c corresponds with the position in which the apex C of the screw has come into contact with the root T of the sleeve.

FIG. 2d corresponds with the position in which the root $C^1$ of the screw has come into contact with the apex $T^1$ of the sleeve or after one-half a rotation of the screw.

FIG. 2e corresponds with the position in which the apex D of the screw is in contact with the root U of the sleeve.

The part-figure 2f corresponds with the position in which the apex A of the screw has come into contact with the root V of the sleeve.

Finally the part-figure 2g corresponds with the end of a complete rotation, reproducing the view of FIG. 2a, but the apex B arrived in contact with the root R of the sleeve.

In this succession of figures it is seen that the section of the chamber located in the vicinity of the root R of the thread in the sleeve first of all grows, passes through a maximum, and becomes zero again at the end of a complete rotation. In fact, by reason of the helicoidal form of the threads, this corresponds with a displacement of the chamber by one pitch of the threading of the sleeve.

It may be observed that the output pressure is a function of the torque allowed by the inertia of the screw as well as the installed driving torque. The output is solely a function of the speed of rotation of the screw, with as limits simply those imposed by the plastic material treated.

Of course the invention is not strictly limited to the sole embodiment which has been described by way of example, but it covers other embodiments which would differ from it only in detail.

Thus the number of threads on the screw and the sleeve is not limited to 4 and 5 respectively; it is sufficient that the screw have one thread less than the sleeve. In this case if the number of threads in the sleeve is designated by N, the number of threads on the screw by N−1, and the pitch of the threading in the sleeve by P, the pitch $P^1$ of the threading on the screw will be determined by the relationship $P^1 = (N-1)P/N$.

I claim:

1. An extrusion unit with a screw rotatable in a sleeve for feeding a die, including a pumping zone to force the product through the die, a sleeve machined internally in the pumping zone with the helicoidal profile with N threads of pitch P, an off-centered screw in said sleeve of mating profile with said helicoidal profile with (N−1) threads of pitch (N−1)P/N and mechanism for setting said screw in ortibal rotation about the axis of said sleeve so as to bear against the internal surface of said sleeve.

* * * * *

UNITED STATES PATENT OFFICE
CERTIFICATE OF CORRECTION

Patent No. 3,779,521       Dated December 18, 1973

Inventor(s) Henri Godines

It is certified that error appears in the above-identified patent and that said Letters Patent are hereby corrected as shown below:

The claim of priority was omitted. It should read

-- France   Application EN 71 16947, May 11, 1971 --.

Signed and sealed this 30th day of July 1974.

(SEAL)
Attest:

McCOY M. GIBSON, JR.
Attesting Officer

C. MARSHALL DANN
Commissioner of Patents